United States Patent
Koeske et al.

(10) Patent No.: US 9,212,717 B2
(45) Date of Patent: Dec. 15, 2015

(54) GAS SPRING END MEMBER AS WELL AS GAS SPRING ASSEMBLY INCLUDING SAME

(75) Inventors: Paul P. Koeske, Fishers, IN (US); Stephen C. Street, Carmel, IN (US)

(73) Assignee: Firestone Industrial Products Company LLC, Indianapolis, IN (US)

( * ) Notice: Subject to any disclaimer, the term of this patent is extended or adjusted under 35 U.S.C. 154(b) by 0 days.

(21) Appl. No.: 14/130,162

(22) PCT Filed: Jul. 2, 2012

(86) PCT No.: PCT/US2012/045246
§ 371 (c)(1),
(2), (4) Date: May 15, 2014

(87) PCT Pub. No.: WO2013/003844
PCT Pub. Date: Jan. 3, 2013

(65) Prior Publication Data
US 2014/0239606 A1     Aug. 28, 2014

Related U.S. Application Data

(60) Provisional application No. 61/565,500, filed on Nov. 30, 2011, provisional application No. 61/503,432, filed on Jun. 30, 2011.

(51) Int. Cl.
*F16F 9/05* (2006.01)
*B60G 11/27* (2006.01)

(52) U.S. Cl.
CPC ............... *F16F 9/057* (2013.01); *B60G 11/27* (2013.01); *F16F 9/05* (2013.01)

(58) Field of Classification Search
CPC ...... F16F 9/057; F16F 9/05; B60G 2202/152; B60G 2204/126; B60G 2206/424; B60G 11/27
See application file for complete search history.

(56) References Cited

U.S. PATENT DOCUMENTS

| | | | | |
|---|---|---|---|---|
| 4,506,910 | A * | 3/1985 | Bierens | 280/124.116 |
| 4,890,823 | A * | 1/1990 | Koschinat et al. | 267/64.27 |
| 5,060,916 | A * | 10/1991 | Koschinat et al. | 267/64.27 |
| 5,180,146 | A * | 1/1993 | Schneider et al. | 267/64.27 |
| 6,234,460 | B1 * | 5/2001 | Arnold | 267/35 |
| 6,250,613 | B1 * | 6/2001 | Koeske et al. | 267/66 |
| 6,386,524 | B1 * | 5/2002 | Levy et al. | 267/64.27 |
| 6,527,259 | B1 * | 3/2003 | Nemeth et al. | 267/64.21 |
| 7,500,659 | B2 * | 3/2009 | Levy | 267/64.27 |
| 8,061,691 | B2 * | 11/2011 | Levy et al. | 267/64.27 |
| 8,231,113 | B2 * | 7/2012 | Grabarz et al. | 267/64.27 |

(Continued)

FOREIGN PATENT DOCUMENTS

DE        10242436 A1 *   4/2004
DE   10 2007 035 640 A1   1/2009

(Continued)

OTHER PUBLICATIONS

International Search Report.

*Primary Examiner* — Drew Brown
(74) *Attorney, Agent, or Firm* — Jason A. Houser; Fay Sharpe LLP

(57) ABSTRACT

A gas spring assembly (200) with a flexible wall (206) being a rolling lobe (240) with an end member (204) including a side wall (238) and a plurality of corrugations disposed along the side wall. A cover (246) can be secured across a cavity (248) formed in the gas spring end member.

17 Claims, 14 Drawing Sheets

(56) References Cited

U.S. PATENT DOCUMENTS

| | | | |
|---|---|---|---|
| 8,864,113 B2* | 10/2014 | Peeters et al. | 267/64.11 |
| 2006/0181145 A1* | 8/2006 | Stuani | 303/123 |
| 2009/0302514 A1* | 12/2009 | Grabarz et al. | 267/64.27 |
| 2010/0000402 A1* | 1/2010 | Egolf | 92/172 |
| 2010/0127438 A1* | 5/2010 | Eise et al. | 267/124 |
| 2012/0291626 A1* | 11/2012 | Westnedge et al. | 92/181 R |
| 2014/0054833 A1* | 2/2014 | Neitzel et al. | 267/64.27 |
| 2014/0061984 A1* | 3/2014 | Hart et al. | 267/64.27 |
| 2014/0167337 A1* | 6/2014 | Ramsey et al. | 267/124 |

FOREIGN PATENT DOCUMENTS

| | | |
|---|---|---|
| EP | 0 446 476 A1 | 9/1990 |
| WO | WO 2004/027284 A1 | 4/2004 |
| WO | WO 2009/148812 A2 | 12/2009 |

\* cited by examiner

GAS SPRING END MEMBER AS WELL AS GAS SPRING ASSEMBLY INCLUDING SAME

BACKGROUND

The subject matter of the present disclosure broadly relates to the art of gas spring devices and, more particularly, to an end member for use in forming a gas spring assembly. A gas spring assembly including such an end member and a suspension system including one or more of such gas spring assemblies are also included. Additionally, an end member assembly including such an end member and a cover therefor is also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a first or fully compressed condition and a second or fully extended condition. To retain the one or more gas spring assemblies in operative association the sprung and unsprung masses, each end of the one or more gas spring assemblies is typically secured on or along opposing structural members of the associated sprung and unsprung masses (e.g., opposing components of a suspension system). As such, conventional gas spring end members are often constructed to withstand forces and loads acting on the gas spring assembly that are transmitted to, from and/or between the opposing structural members of the associated sprung and unsprung masses. Additionally, conventional gas spring end members are often constructed to withstand conditions associated with use in operation during over-the-road travel and/or under similar environments, such as impacts from rocks and debris and the collection of dirt.

In some cases, however, it may be desirable to reduce the overall weight of a vehicle suspension system. Reducing the weight of the end members of the one or more gas spring assemblies can be one contributing factor to achieving such a goal. In some cases, known end member designs have been formed from a polymeric material to contribute to reduced suspension system weight. Such polymeric materials can include, without limitation, glass or other fiber-reinforced polypropylene, glass or other fiber-reinforced polyamide, for example, and high-strength (unfilled) thermoplastics, such as polyester, polyethylene, and other polyether-based materials, or any combination thereof.

As one example, an end member may include an inner wall that encloses a volume or chamber in communication with a volume or chamber formed by a flexible wall of the gas spring assembly. In many cases, an outer wall will generally surround the inner wall. In such cases, the flexible wall of the gas spring assembly can form a rolling-lobe that is displaced along an outer surface of the outer wall as the gas spring assembly undergoes changes in overall height. For example, variations in forces and/or load conditions applied to the suspension system will result in greater or lesser portions of the outer wall being covered by the flexible wall.

In many cases, extending between the inner chamber wall and the outer wall of the end member are one or more circumferentially spaced ribs. Each rib may extend over a substantial height of a radial gap between the inner wall and the outer wall, or in other instances the rib may extend over only a portion of the height. Reducing the thickness of the inner wall and/or outer wall, as well as one or more the ribs, is one way to reduce overall weight of the end member. In many cases, however, there may be a corresponding loss in strength, rigidity and/or overall robustness of the end member that is associated with such reductions, and such loss may be undesirable.

Notwithstanding the widespread usage and overall success of the wide variety of end member designs that are known in the art, it is believed that a need exists to meet these competing goals while still retaining comparable or improved performance, ease of manufacture, ease of assembly, and/or the ability to withstand impacts and reduce the collection of materials without adversely affecting the strength, rigidity, robustness and/or overall integrity of the gas spring assembly.

BRIEF SUMMARY

One example of a gas spring end member in accordance with the subject matter of the present disclosure can include an end member body having a longitudinally-extending axis, at least one side wall extending in a longitudinal direction, and a plurality of corrugations disposed peripherally about the axis in spaced-relation to one another along the at least one side wall. In some cases, the at least one side wall can include an inner side wall and/or an outer side wall.

One example of a gas spring end member and cover assembly in accordance with the subject matter of the present disclosure can include an end member that includes an end member body having a longitudinally-extending axis, at least one side wall extending in a longitudinal direction, and a plurality of corrugations disposed peripherally about the axis in spaced-relation to one another along the at least one side wall. The end member can also include at least one cavity having an opening. A cover can be disposed along the end member and can extend at least partially across the opening of the at least one cavity. In some cases, the at least one side wall can include an inner side wall and an outer side wall with the plurality of corrugations along at least one of the inner side wall and the outer side wall. Additionally, or in the alternative, in some cases, the at least one cavity can be disposed between the inner and outer side walls. In some cases, the opening of the at least one cavity can be formed along an end of the end member, and, in some cases, can be secured on or along the end member.

One example of a gas spring assembly in accordance with the subject matter of the present disclosure can include a flexible wall having a longitudinal axis and extending peripherally about the longitudinal axis between opposing first and second ends and at least partially defines a spring chamber. A first end member can be operatively connected in a substantially fluid-tight manner across the first end of the flexible wall. A second end member can be spaced longitudinally from the first end member and can be operatively connected in a substantially fluid-tight manner across the second end of the flexible wall. The second end member can include at least one side wall and a plurality of corrugations disposed peripherally about the at least one side wall. In some cases, the end member can include at least one cavity having an opening, and the gas spring assembly can include a cover disposed adjacent the end member and extending at least partially across the opening of the at least one cavity. In some cases, the cover can be secured on or along the end member.

Another example of a gas spring assembly in accordance with the subject matter of the present disclosure can include a flexible wall having a longitudinal axis and extending peripherally about the longitudinal axis between opposing first and second ends and at least partially defines a spring chamber. A first end member can be operatively connected in a substantially fluid-tight manner across the first end of the flexible wall. A second end member can be spaced longitudinally from the first end member and can be operatively connected in a substantially fluid-tight manner across the second end of the flexible wall. The second end member can include at least one side wall and a cavity exposed to external atmosphere through an opening. A cover can be secured on or along the end member and extending at least partially across the opening of the cavity. In some cases, the second end member can include a plurality of corrugations disposed peripherally about the at least one side wall.

DETAILED DESCRIPTION

Figure 1:
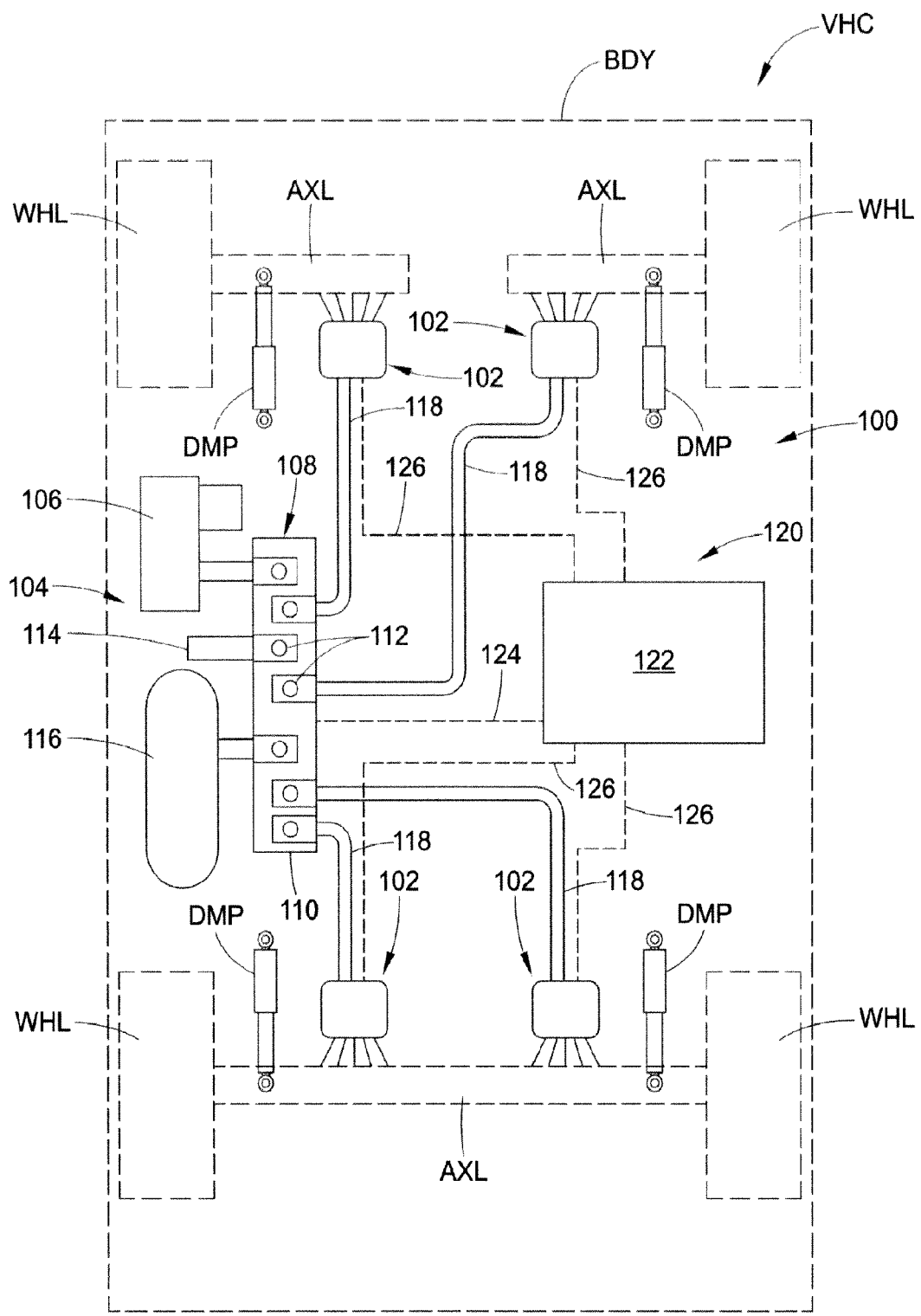
FIG. 1 is a schematic representation of one example of a suspension system of an associated vehicle including a plurality of gas spring assemblies in accordance with the subject matter of the present disclosure.

Turning now to the drawings, wherein the showings are for the purpose of illustrating examples of the subject matter of the present disclosure and which are not to be interpreted as limiting the same, FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also optionally include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/ or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 126, for example. Additionally, it will be appreciated that the height sensing devices can be of any suitable type, kind and/or construction.

Figure 2:
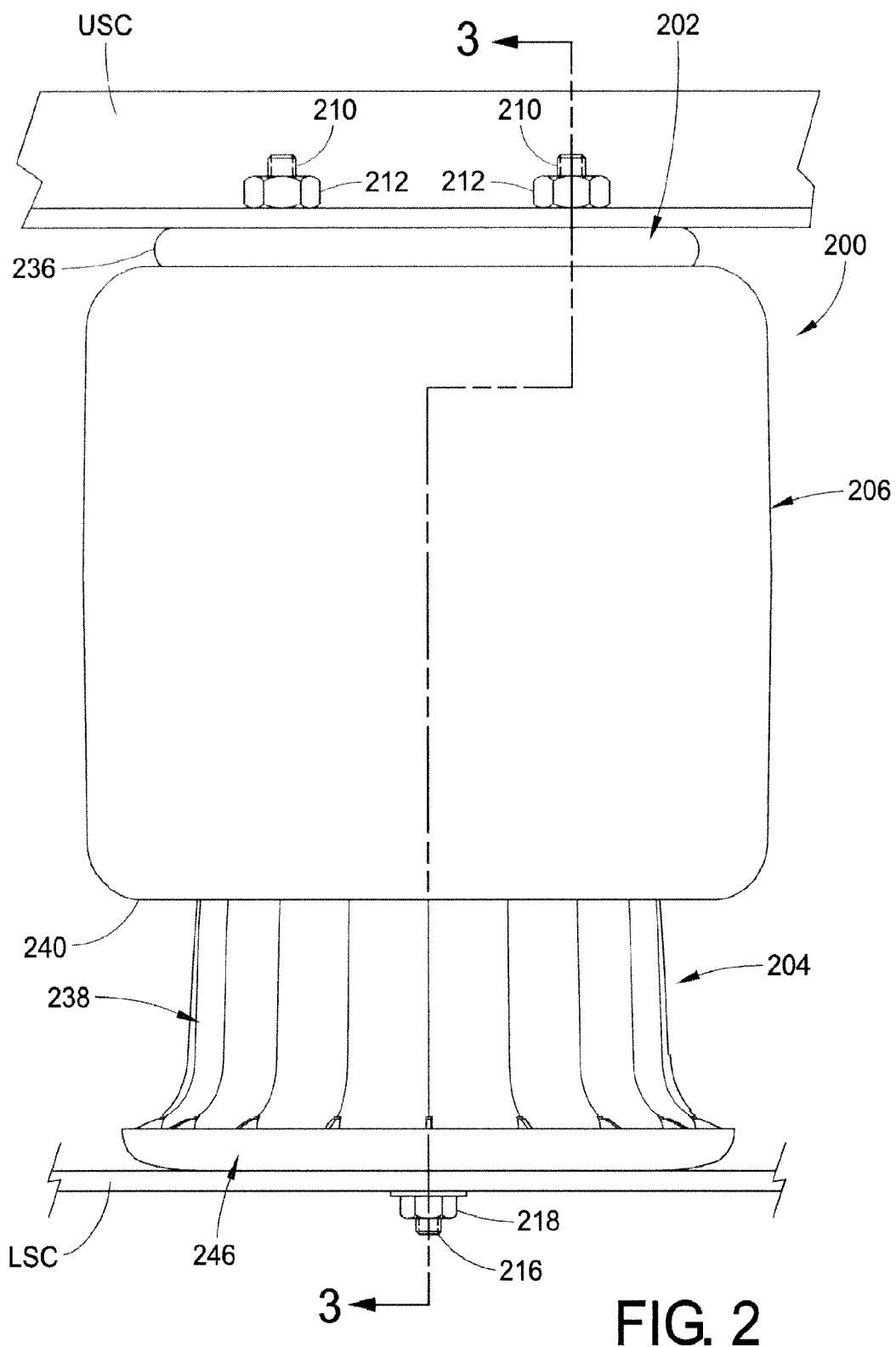
FIG. 2 is a side view of one example of a gas spring assembly in accordance with the subject matter of the present disclosure.
Figure 3:
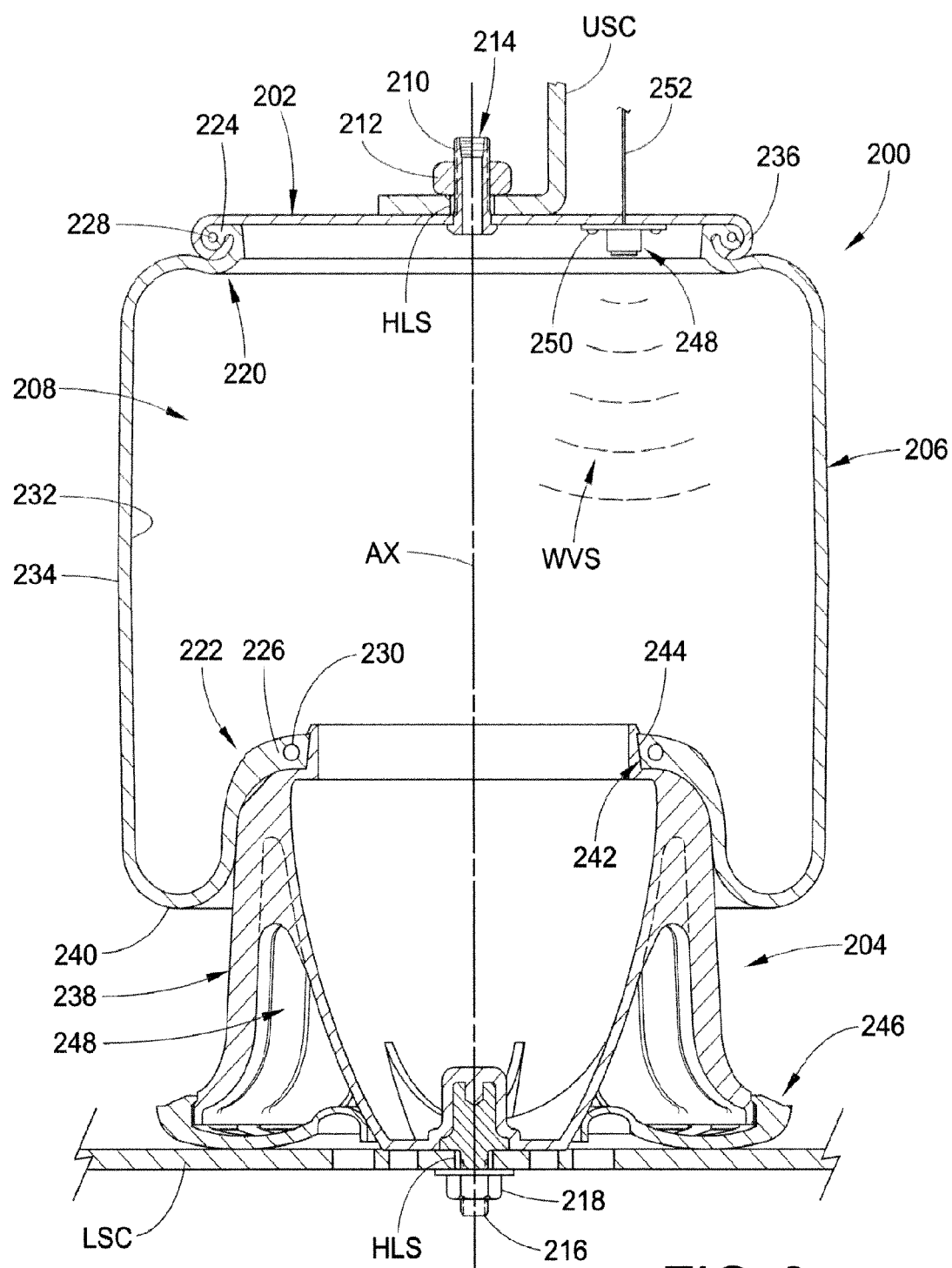
FIG. 3 is a cross-sectional side view of the gas spring assembly in FIG. 2 taken from along line 3-3 therein.
Figure 4:
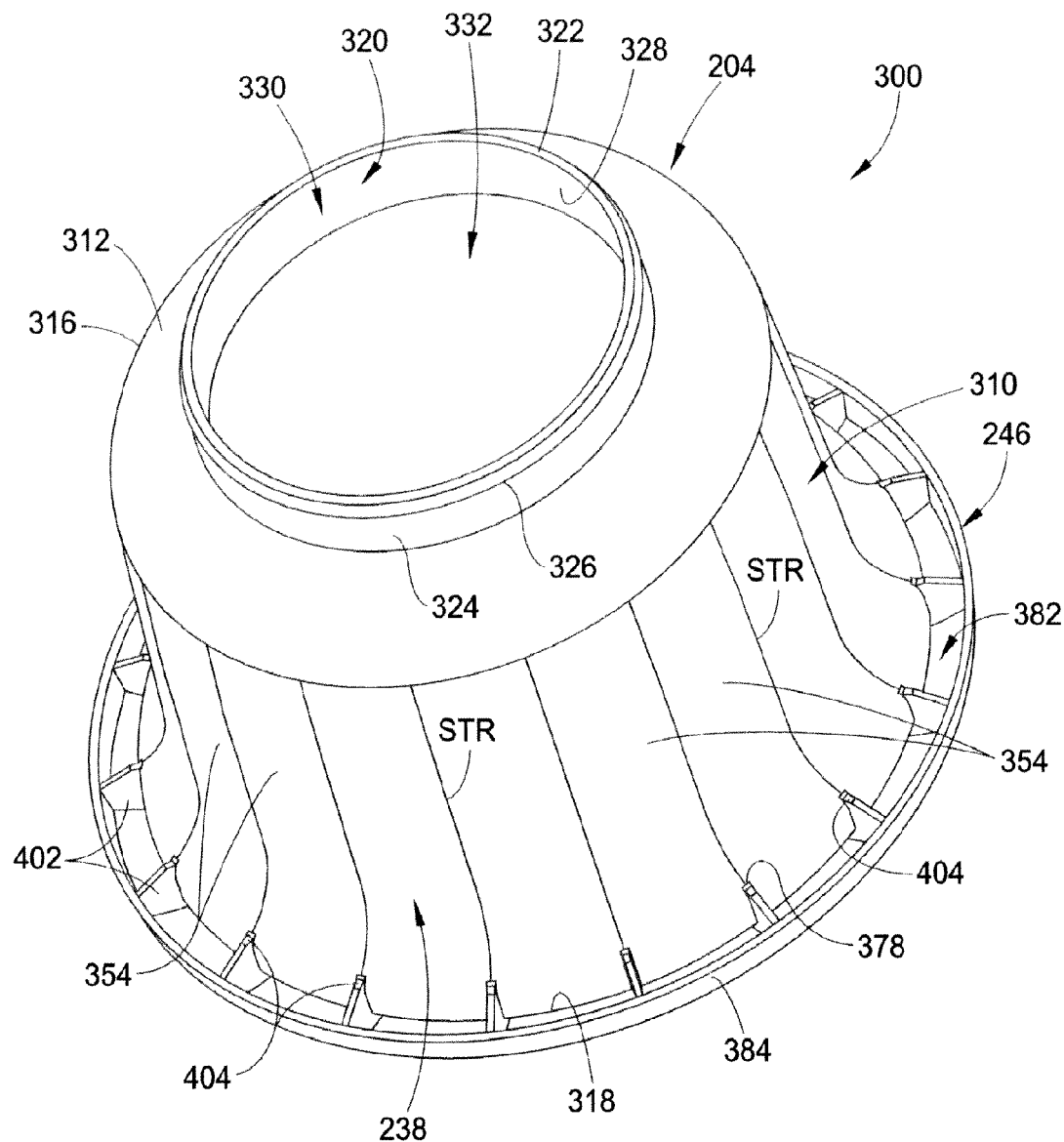
FIG. 4 is a perspective view of one example of an end member and cover assembly in accordance with the subject matter of the present disclosure, such as is illustrated in FIGS. 2 and 3.
Figure 5:
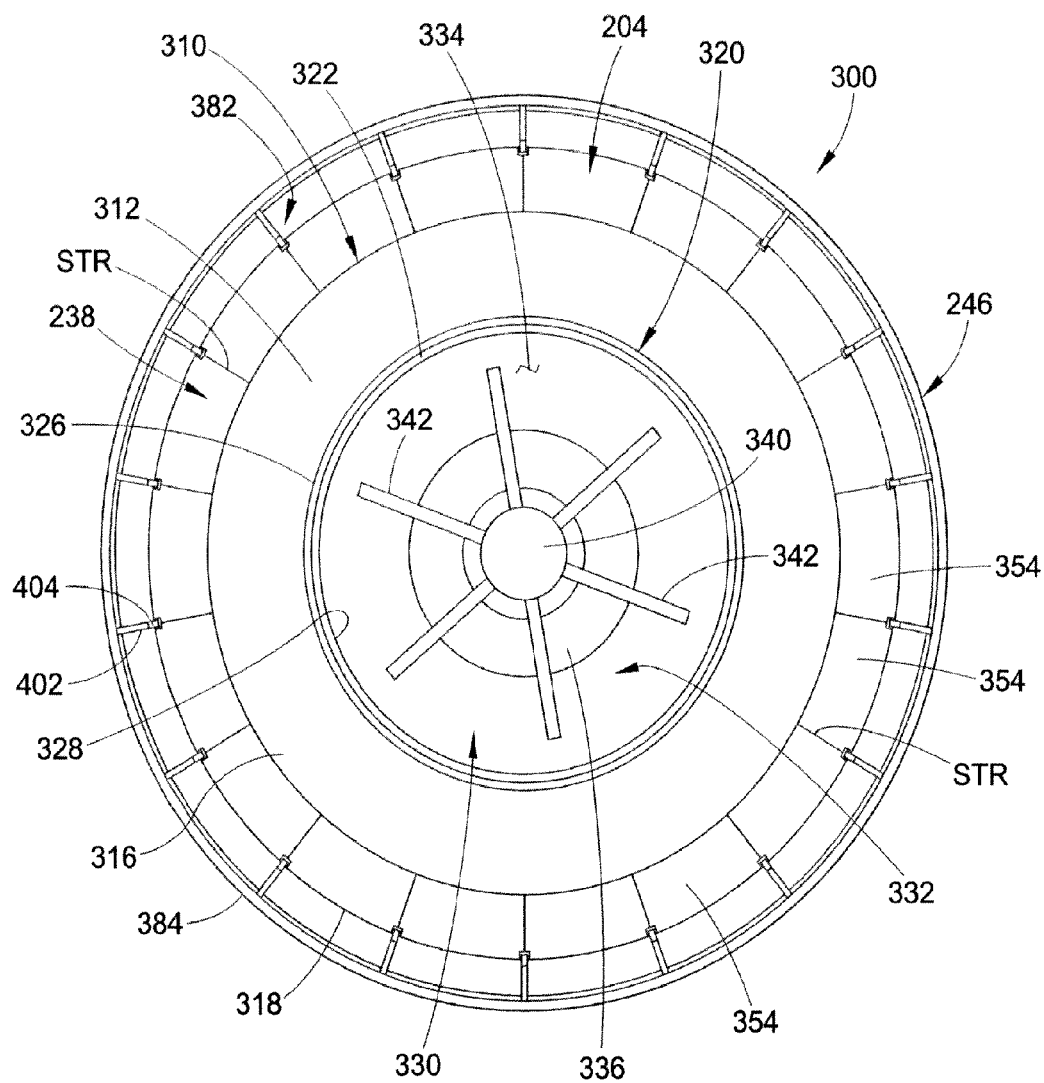
FIG. 5 is a top plan view of the end member and cover assembly illustrated in FIG. 4.
Figure 6:
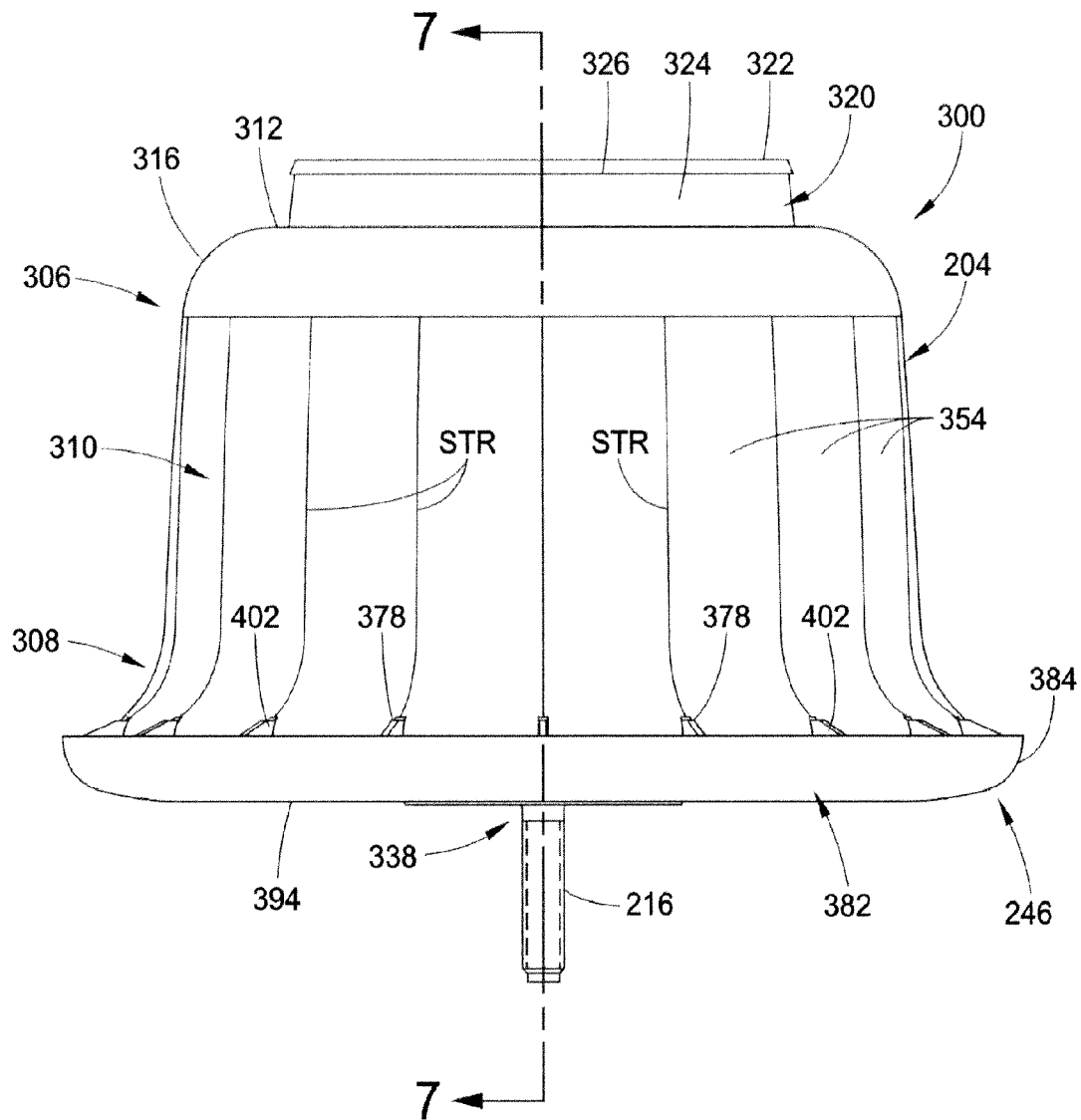
FIG. 6 is a side elevation view of the end member and cover assembly illustrated in FIGS. 4 and 5.

One example of a gas spring assembly 200 is shown in FIGS. 2 and 3 as having a longitudinally-extending axis AX (FIG. 3) and can include one or more end members, such as an end member 202 and an end member 204 that is spaced longitudinally from end member 202. A flexible wall 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as may be representative of associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS (FIG. 3) in upper structural component USC and receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214 (FIG. 3), for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member 204 can be secured along a second or lower structural component LSC, such as may be representative of an axle AXL in FIG. 1, for example, in any suitable manner. As one example, lower structural component LSC could include one or more mounting holes HLS (FIG. 3) extending therethrough. In such case, a mounting stud 216 could be operatively connected to end member 204 and could extend through one of mounting holes HLS to receive a corresponding threaded nut 218, for example.

In the exemplary arrangement shown in FIGS. 2 and 3, flexible wall 206 extends between ends 220 and 222. A mounting bead or other connection feature can, optionally, be included on or along either or both of ends 220 and 222. In the arrangement shown, flexible wall 206 includes a mounting bead 224 disposed along end 220 and a mounting bead 226 disposed along end 222. Additionally, the flexible wall can, in some cases, include one or more annular reinforcing elements that are at least partially embedded within the flexible wall, such as along one or more of the mounting beads or other connection features, for example. In the arrangement shown in FIGS. 2 and 3, for example, flexible wall 206 includes a bead core 228 disposed within mounting bead 224 and a bead core 230 disposed within mounting bead 226. Bead cores 228 and 230 can be of a conventional construction. Flexible wall 206 also includes an inside surface 232 that at least partially defines spring chamber 208 and an outside surface 234.

Flexible wall 206 can be formed from suitable, known materials such as one or more fabric-reinforced, elastomeric plies or layers (not shown) and/or one or more un-reinforced, elastomeric plies or layers (not shown). Typically, the plies will be used together and formed from a common elastomeric material, such as a synthetic rubber, a natural rubber, or a thermoplastic elastomer. In other instances, a combination of two or more different materials, or two or more grades of the same material, could be used in order to provide certain material and/or mechanical properties such as a hardness property.

It will be appreciated that the one or more end members can be of any suitable type, kind, construction and/or configuration, and can be operatively connected or otherwise secured to the flexible wall in any suitable manner. End member 202 is shown as being of a type commonly referred to as a bead plate, and is secured to end 220 of flexible wall 206 using a connection in which an outer peripheral edge 236 of the end member is crimped or otherwise formed into engagement around mounting bead 224 such that a substantially fluid-tight seal is formed between the flexible wall and the end member.

End member 204 is shown in FIGS. 2 and 3 as being of a type commonly referred to as a "piston" or a "roll-off piston" that has an outer side wall 238 that abuttingly engages at least a portion of outer surface 234 of the flexible wall such that a rolling lobe 240 is formed therealong. As gas spring assembly 200 is displaced between extended and collapsed conditions, rolling lobe 240 is displaced along outer side wall 238 in a conventional manner, such as may result from variations in load and/or input conditions applied thereto. Flexible wall 206 can be operatively connected on or along end member 204 in any suitable manner. For example, although not illustrated in FIG. 3, the lower mounting bead of the flexible wall could be captured between an end closure and the end member in a conventional manner, and the end closure could be secured on the end member using a suitable securement device or assembly, such as a mounting stud and nut, for example. Alternately, flexible wall 206 can be secured along end member 204 by way of a friction-fit and/or snap-fit connection 242 in which a substantially fluid-tight seal is formed between one or more walls or wall portions of the end member and an end wall 244 of mounting bead 226.

Figure 7:
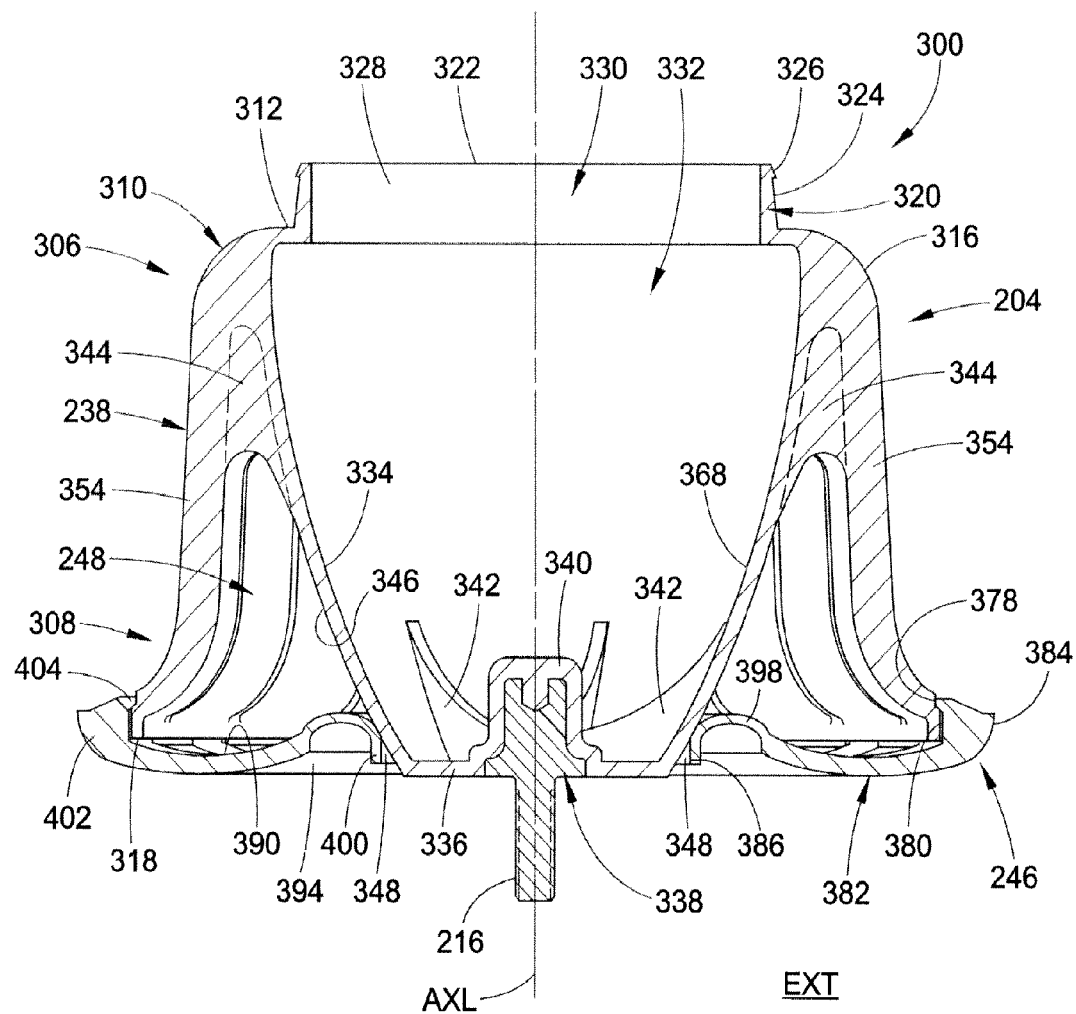
FIG. 7 is a cross-sectional side view of the end member and cover assembly illustrated in FIGS. 4-6 taken from along line 7-7 in FIG. 6.

As discussed above, one or more features and/or elements of end member 204 may contribute to achieving the competing goals of an end member having reduced weight and an end member having a desired level of strength, rigidity, robustness and/or overall integrity. In some cases, an impact-resistant or sacrificial element can, optionally, be disposed on or along the end member to assist in achieving the aforementioned competing goals, and/or for other reasons. In the arrangement shown in FIGS. 2 and 3, a cover 246 is provided that, for example, may be suitable for use in inhibiting direct impact of at least a portion of end member 204 and/or for use in reducing the collection of materials on or along the end member. For example, an end member can include one or more cavities and/or chambers 248 that are fluidically isolated from the spring chamber and any piston chamber. In some cases, such one or more cavities and/or chambers can include a corresponding number of one or more openings through which the one or more cavities and/or chambers can be exposed to an external atmosphere. In the example shown, cavity 248 is at least partially defined between an inner side wall and an outer side wall and includes an opening (not numbered) that is exposed to an external atmosphere EXT (FIG. 7) in the absence of cover 246. In some cases, such one or more cavities (e.g., cavity 248) can be prone to collecting dust, dirt and debris.

It will be appreciated that such a cover can be formed from any material or combination of materials, such as may be suitable for a particular application and/or use in a given operating environment. In some cases, cover 246 can be formed of a lower durometer, impact-resistant material than that of end member 204. Alternately, the cover can be formed from a higher strength and/or higher durometer material than that of end member 204, and can act as a sacrificial component under high-velocity and/or high-force impact conditions. It will be appreciated that, if included, an impact-resistant and/or sacrificial element, such as cover 246, for example, can be supported on or along the end member in any suitable manner.

Additionally, it will be appreciated that a gas spring assembly in accordance with the subject matter of the present disclosure, such as gas spring assembly 102 and/or 200, for example, can include any number of one or more additional components and/or features. For example, a jounce bumper (not shown) can, optionally, be supported within the spring chamber, such as to inhibit direct contact between end members 202 and 204, for example. It will be appreciated that the jounce bumper, if included, can be supported on or along an end member in any suitable manner. As another example, a height or distance sensing device 248 is, optionally, shown in FIG. 3 as being disposed within spring chamber 208 along end member 202 and being secured thereto using suitable fasteners 250. Height sensing device 248 can be of any suitable type, kind and/or construction, such as an ultrasonic sensor that transmits and receives ultrasonic waves WVS (FIG. 3), for example. Additionally, it will be appreciated that height sensing device 248 can be connected to other systems and/or components of a vehicle suspension system in any suitable manner. As shown in FIG. 3, height sensing device 248 includes a lead or connection 252 that can be used for such communication purposes, such as is indicated by leads 126 of control system 120 in FIG. 1, for example.

FIGS. 4-7 illustrate end member 204 and cover 246 together as an end member and cover assembly 300 in accordance with the subject matter of the present disclosure. Additionally, FIGS. 8-11 and FIGS. 12-14 respectively illustrate end member 204 and cover 246 in detail as individual components. As such, end member and cover assembly 300 is shown in FIGS. 4-7 as including end member 204 and cover 246 that is operatively secured to the end member. As mentioned above, it will be recognized and appreciated that end member 204 is of the type commonly referred to in the art as a "piston" or a "roll-off piston," and that such terms may be used interchangeably herein in reference to end member 204 and other components of this type.

As identified in FIGS. 4-11, end member or piston 204 can include a longitudinally-extending axis AX1 (FIG. 7), and can extend axially between an end 306 and an end 308 that is opposite end 306. Piston 204 includes a piston body 310 that includes an end wall 312 disposed along end 306 and oriented transverse to axis AX1. Piston body 310 also includes outer side wall 238 that extends generally longitudinally between ends 306 and 308, and that transitions into end wall 312 along a shoulder 316. Outer side wall 238 terminates at a distal edge 318 disposed toward lower end 308.

As discussed above, it will be appreciated that piston 204 can be operatively connected with an end of a flexible wall, such as end 222 of flexible wall 206, for example, such that a substantially fluid-tight seal is formed therebetween. As one example, piston body 310 can include an inner side wall 320 that extends around axis AX1 along end 306 and longitudinally outwardly from end wall 312. Inner side wall 320 terminates at a distal edge 322, and includes an outer surface 324 with an annular projection 326 radially outwardly therealong. Inner side wall 320 also includes an inner surface 328 that at least partially defines an open end 330 of a piston chamber 332 that is formed within piston body 310. As described above, the flexible wall (e.g., flexible wall 206) can include an end wall (e.g., end wall 244) disposed in abutting engagement with outer surface 324 such that they substantially fluid-tight seal can be formed therebetween. The flexible wall (e.g., flexible wall 206) can also include a reinforced region (e.g., mounting bead 226 with reinforcing element 230) that is snap fit beneath projection 326 to retain the end of the flexible sleeve on the piston body.

Piston body 310 can also include an inner side wall 334 that extends longitudinally toward end 308 from along end wall 312 and/or outer side wall 238. An end wall 336 extends across inner side wall 334 in a direction transverse to axis AX1. Together inner side wall 334 and end wall 336 at least partially define a closed end (not numbered) of piston chamber 332. In a preferred arrangement, end wall 336 extends axially-outwardly beyond distal edge 318 such that end wall 336 can abutting engage an associated structural component (e.g., lower structural component LSC) with the distal edge spaced away from the associated structural component.

It will be appreciated that piston 204 can be secured or otherwise operatively connected to the associated structural component in any suitable manner. As one example, a threaded passage (not shown) could extend into or be otherwise formed by end wall 336 and dimensioned to receive a corresponding threaded fastener (not shown). As another example, a stud insert 338 can be captured and retained along end wall 336 by a portion 340 thereof. In such case, stud insert 338 can include mounting stud 216 that projects axially-outwardly beyond end wall 336 and can be dimensioned to extend through an associated structural component to receive a corresponding securement device, such as threaded nut 218 (FIGS. 2 and 3), for example.

Piston body 310 can, optionally, include one or more support walls 342 extending between and operatively interconnecting inner side wall 334 and portion 340 along end wall 336. Additionally, piston body 310 can, optionally, include one or more support walls 344 extending between and operatively interconnecting inner side wall 334 and outer side wall 238. Furthermore, piston body 310 can, optionally, include one or more projections extending outwardly from along inner side wall 334. In the arrangement shown in FIGS. 7 and 9, inner side wall 334 includes an outer surface 346 and a plurality of projections 348 extend outwardly therefrom adjacent end wall 336. Projections 348 are spaced apart from one another around the periphery of inner side wall 334, and include a radially-outer surface 350 extending in approximate alignment with axis AX and an axially-outer surface 352 disposed transverse to the axis.

Figure 10:
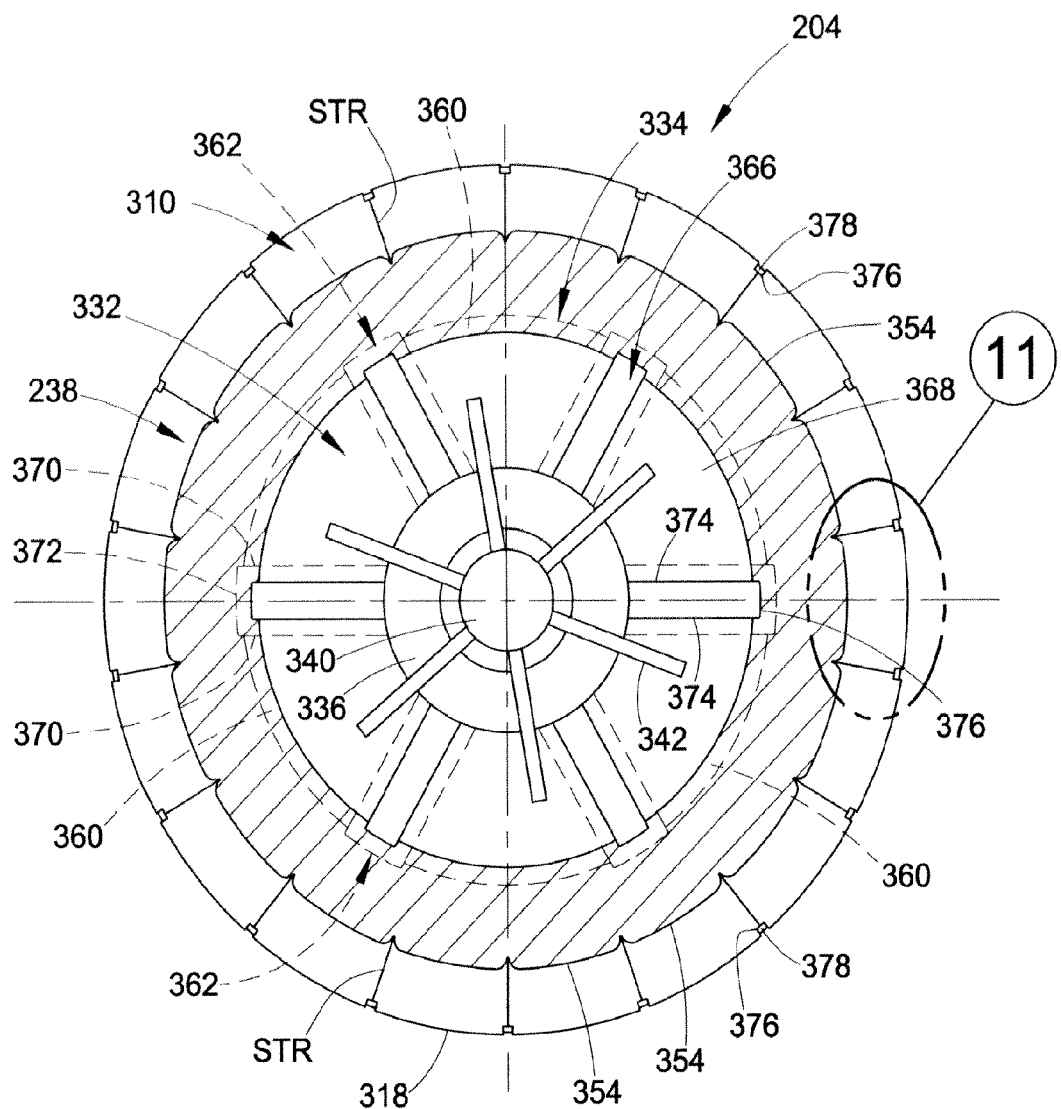
FIG. 10 is a cross-sectional plan view of the end member in FIGS. 8 and 9 taken from along line 10-10 in FIG. 9 and illustrating an alternate inner side wall configuration.
Figure 11:
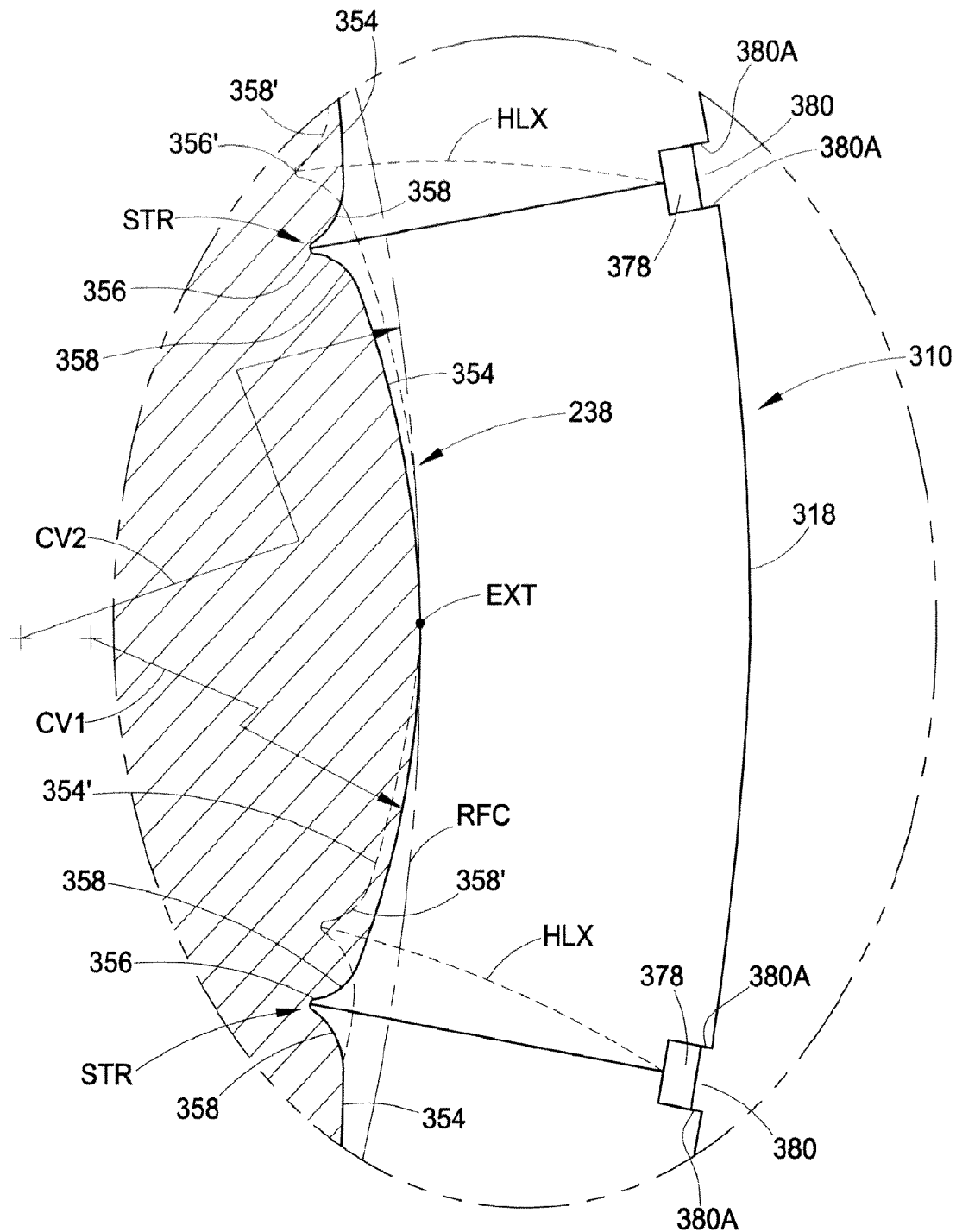
FIG. 11 is an enlarged view of the portion of the end member illustrated in FIGS. 8-10 that is identified as Detail 11 in FIG. 10.
Figure 12:
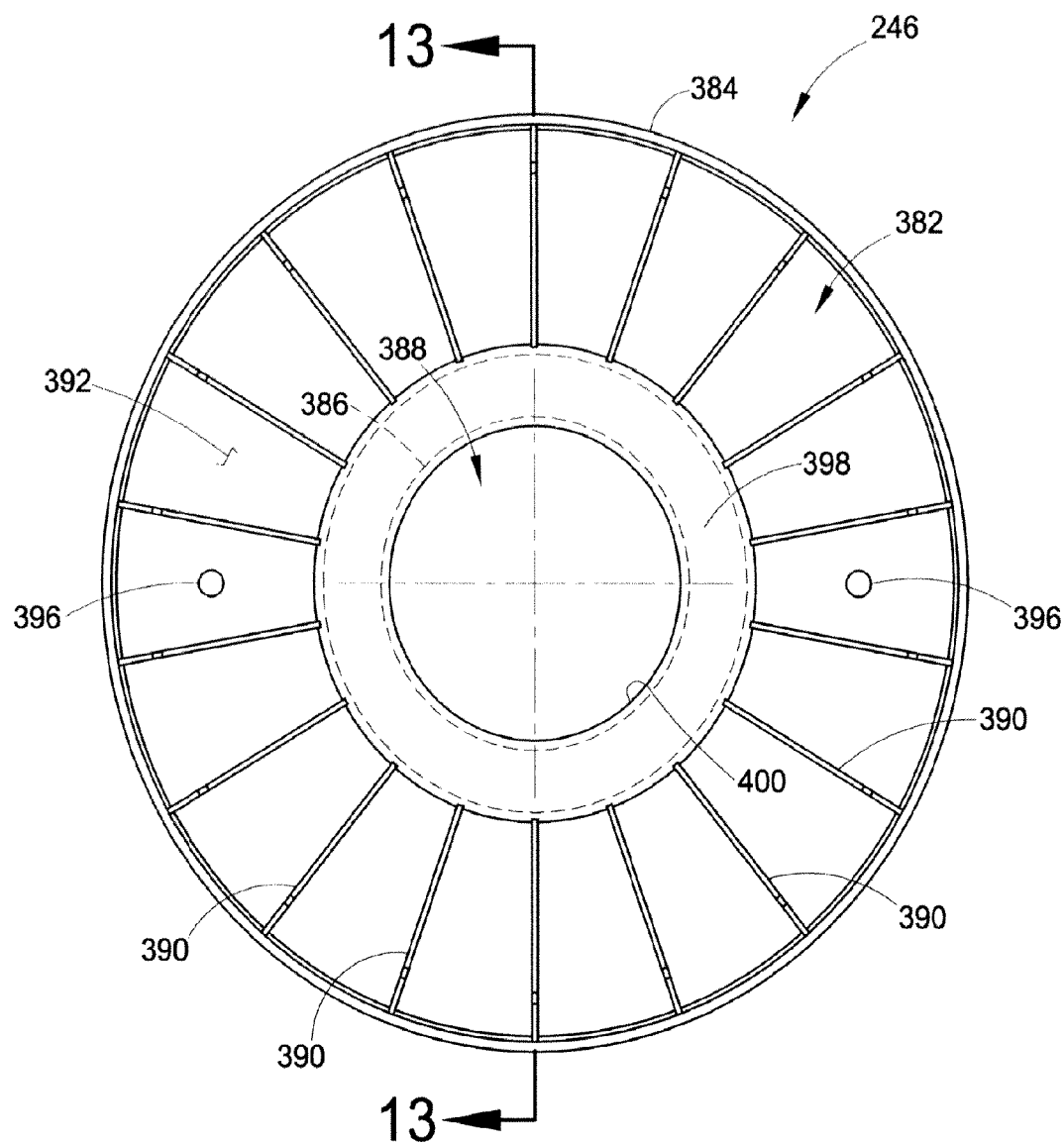
FIG. 12 is a top plan view of one example of a cover in accordance with the subject matter of the present disclosure, such as is illustrated in FIGS. 2-7.
Figure 13:
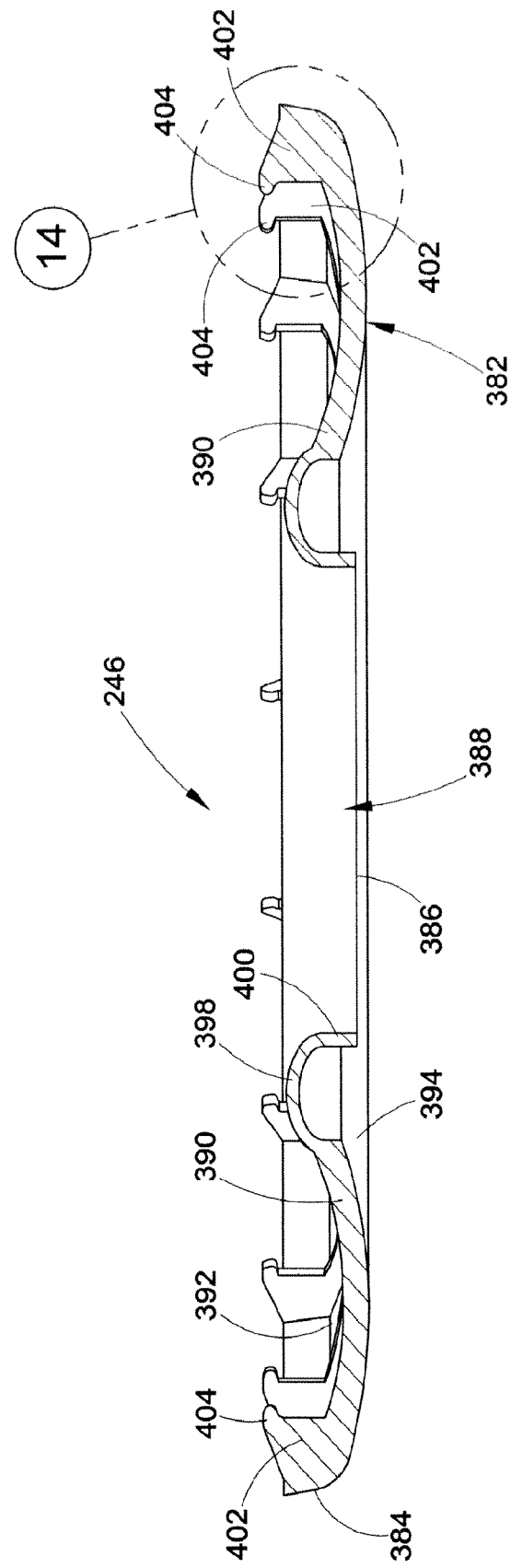
FIG. 13 is a cross-sectional side view of the cover in FIG. 12 taken from along line 13-13 therein.
Figure 14:
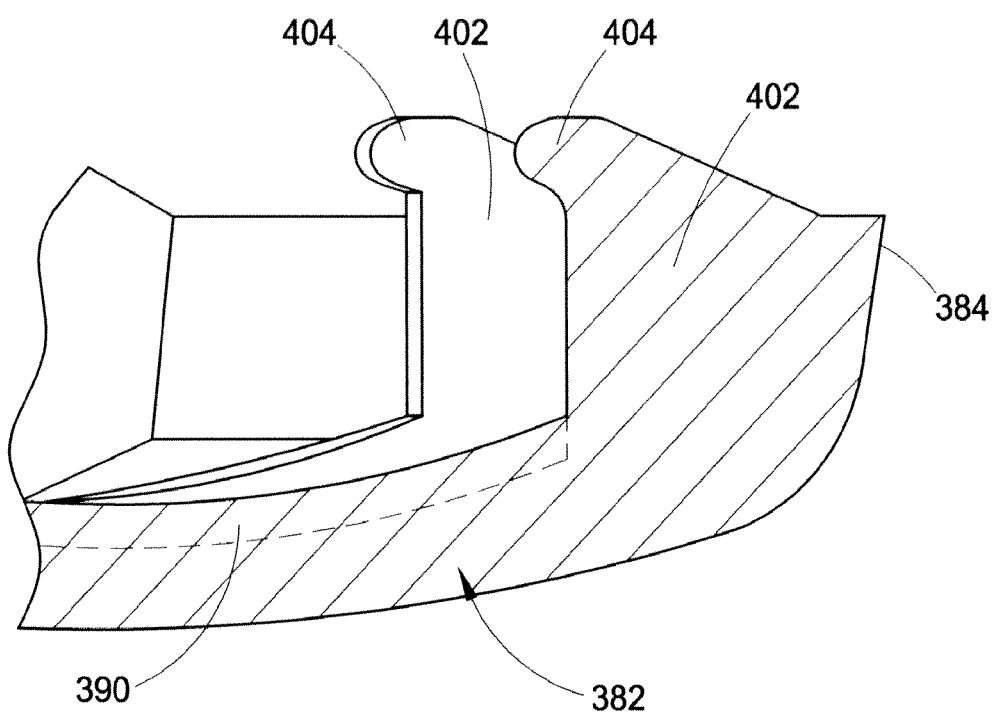
FIG. 14 is an enlarged view of the portion of the cover in FIGS. 12 and 13 that is identified as Detail 14 in FIG. 13.

Piston 204 can include one or more of a variety of shapes and/or conformations, such as along the inner and/or outer side walls thereof. As identified in FIGS. 4-11, piston body 310 is shown as including a plurality of wall portions 354 that are disposed in spaced relation to one another around outer side wall 238. As illustrated in FIGS. 10 and 11, the cross-section of outer side wall 238 when viewed from a generally horizontal plane can appear as having a generally scalloped or pumpkin-like shape.

In a preferred arrangement, a relatively smooth transition STR can be used between adjacent ones of wall portions 354. As illustrated in FIG. 11, for example, the cross-sectional profile of outer side wall 238 can, optionally, include a connecting wall portion 356 disposed between adjacent ones of wall portions 354 such that a plurality of connecting wall portions 356 are disposed peripherally about axis AX1. It will be appreciated that wall portions 354 can have any suitable shape or configuration. In some cases, wall portions 354 can have a curved cross-sectional profile or shape. In other cases, wall portions 354 could have a curvature that is sufficiently great so as to approximate a linear cross-sectional profile. Additionally, in some cases, connecting wall portions 356 can have a curvature (e.g., a radius or an irregular non-linear shape) that is substantially smaller than the curvature (e.g., a radius or an irregular non-linear shape) of wall portions 354. In a preferred arrangement, at least wall portions 354 and connecting wall portions 356 at least partially define an outer surface (not numbered) of outer side wall 238. In some cases, wall portions 354 can curve outward and can have a center of curvature (not identified) disposed inward of the outer surface of side wall 238. Additionally, in some cases, connecting wall portions 356 can curve inward and can have a center of curvature (not identified) disposed outward of the outer surface of side wall 238.

In some cases, the cross-sectional profile of outer side wall 238 can include one or more additional wall portions that extend between or otherwise interconnect wall portions 354 and connecting wall portions 356. As one example, the cross-sectional profile of outer side wall 238 is shown in FIG. 11 as including transition wall portions 358 that are disposed along opposing ends of wall portions 354 and interconnect one of wall portions 354 and a corresponding one of connecting wall portions 356. Additionally, in some cases, transition wall portions 358 can have a curvature (e.g., a radius or an irregular non-linear shape) that is substantially smaller than the curvature (e.g., a radius or an irregular non-linear shape) of wall portions 354. It will be appreciated, however, that other configurations and/or arrangements could alternately be used.

Additionally, in some cases, transition wall portions 358 can curve outward and can have a center of curvature (not identified) disposed inward of the outer surface of side wall 238.

In some cases, wall portions 354 can have a radius or curvature CV1 that differs from the radius or curvature CV2 of a reference circle RFC that extends peripherally about and interconnects an outermost extents EXT (in cross-sectional profile) of two or more of wall portions 354, as is shown in FIG. 11. Additionally, it will be appreciated that the cross-sectional profile (e.g., radius or curvature) of wall portions 354, 356 and/or 358 can vary in the longitudinal direction, such as along at least a portion of outer side wall 238, for example.

As indicated above, the cross-sectional profile of outer side wall 238 can have a generally scalloped, pumpkin-shape that may increase the strength, rigidity and/or overall robustness of piston 204. Increasing the strength and/or rigidity of outer side wall 238 may, in some cases, allow for use of thinner piston wall sections (i.e., outer side wall 238), as well as use of support walls 344 that have a reduced thickness dimension and/or extend at a reduced number of perimeter/circumferentially-spaced locations between inner side wall 334 and outer side wall 238. In FIGS. 2 and 3, it is evident that wall portions 354 provide for smooth arcuate outer surfaces along the outer surface or perimeter of piston 204. This arrangement is conducive for receipt of rolling lobe 240 of flexible wall 206 during height changes of the gas spring assembly. Generally, the avoidance of sharp corners or edges is preferred since more abrupt corners/edges could potentially lead to pinch points or abrasion regions as rolling lobe 240 proceeds upwardly and downwardly along the outer surface of outer side wall 238 during use.

Figure 8:
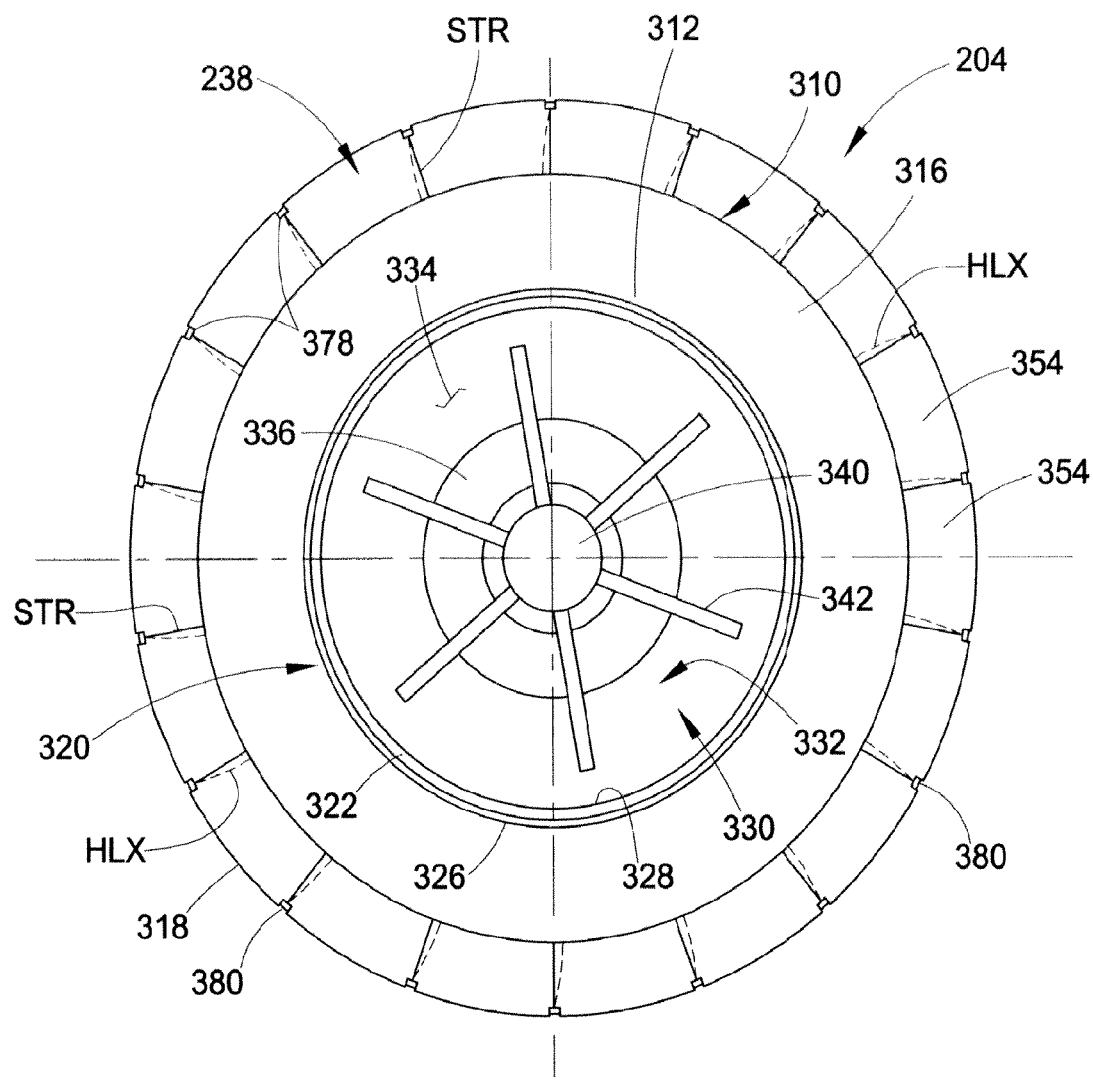
FIG. 8 is a top plan view of one example of an end member in accordance with the subject matter of the present disclosure, such as is illustrated in FIGS. 2-7.
Figure 9:
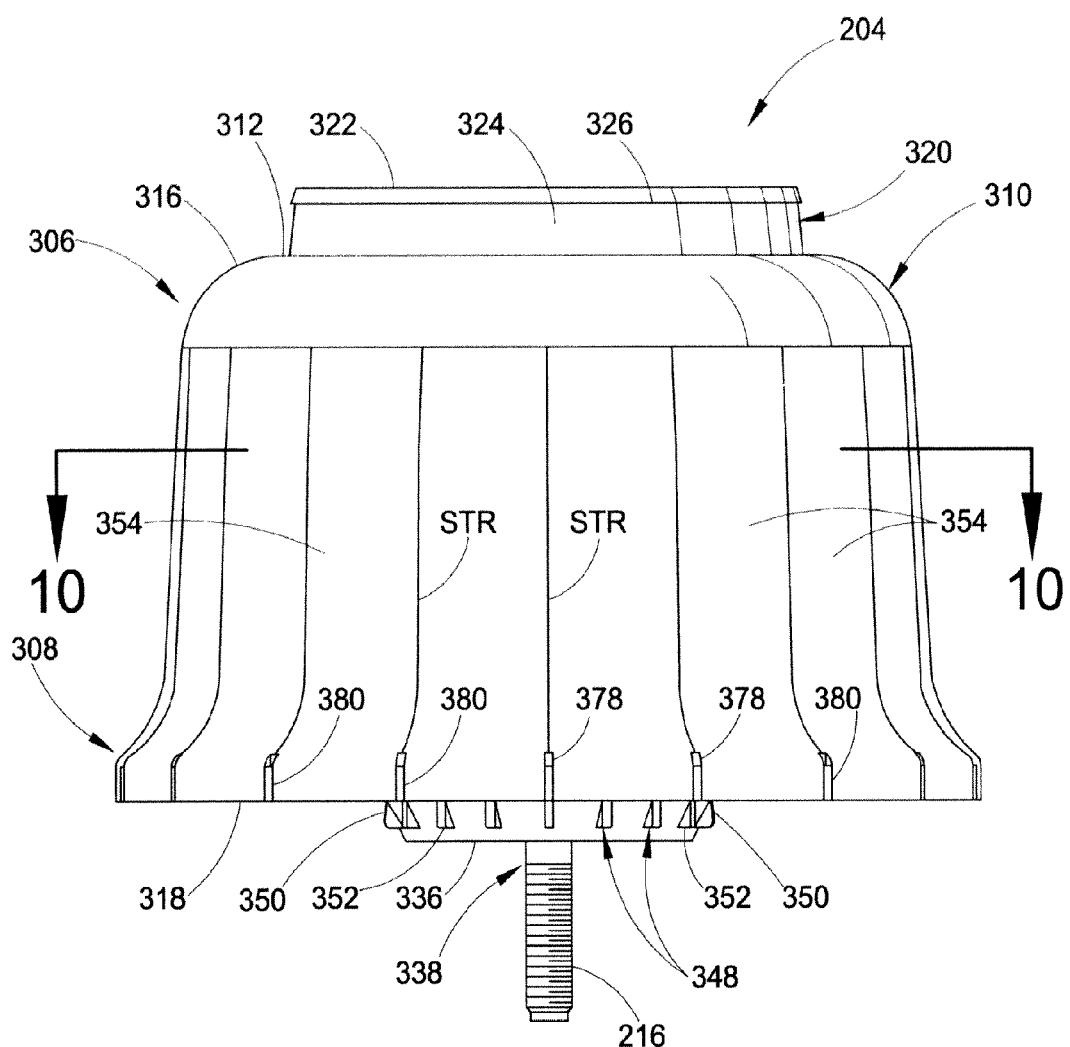
FIG. 9 is a side elevation view of the end member illustrated in FIG. 8.

An alternate configuration of piston 204 in which the shape of outer side wall 238 includes helical or spiral twist to wall portions 354 as the wall portions proceed from end wall 312 toward end 308 of the piston is represented in FIGS. 8 and 11 by dashed lines HLX, 354', 356' and 358', the latter three of which can represent alternate starting positions of wall portions 354, 356 and/or 358, if included. While linearly extending wall portions without a twist may improve the ability of the piston to withstand impacting debris, the generally gradually curved twist or spiral as the cross-sectional profile of wall portions 354 proceed from adjacent end wall 312 toward end 308 of the piston body may further improve the ability to withstand debris impact. Additionally, any debris may have less chance of contacting a large surface area of the outer shell as a result of using the curved/twisted, scalloped shape. Again, one skilled in the art will recognize that modifications to the scalloped shape may be contemplated. By way of example, wall portions 354 may only be required along a lower portion of outer side wall 238. That is, that region of the outer surface of the piston closer to end wall 312 may retain a smooth outer surface and constant thickness profile as used in prior arrangements and the scalloped configuration incorporated into the lower portion only of the outer shell (e.g. lower ⅓ to ½ of the height of the outer shell). However, alternative configurations must necessarily include considerations relating to the rolling lobe of the flexible wall and possible pinching or abrasion thereof, as well as ease of manufacture, assembly, and associated strength, rigidity, and cost.

Additionally, or as an alternative to the configuration of outer side wall 238, inner side wall 334 of piston body 310 can include a plurality of wall portions 360 that are disposed adjacent one another around inner side wall 334. It will be appreciated that wall portions 360 can have any suitable shape or configuration. In some cases, wall portions 360 can have a curved cross-sectional profile or shape. In other cases, wall portions 360 could have a curvature that is sufficiently great so as to approximate a linear cross-sectional profile. In some cases, for example, at least a portion of the inner and/or outer surface of inner side wall 334 when viewed from a generally horizontal plane can appear as having a generally scalloped or pumpkin-like shape, such as may be similar to that of the outside surface of outer side wall 238, for example.

In the exemplary arrangement shown in FIG. 10, inner side wall 334 has a generally corrugated shape, shown as including a plurality of circumferentially spaced, generally rectangular shaped, longitudinally extending ribs 362 disposed along an outer surface 346 of inner side wall 334. Inner side wall 334 can additionally, or alternatively, include grooves 366 disposed along an inner surface 368 of inner side wall 334, which in some cases may correspond to ribs 362, if provided. Ribs 362 and/or grooves 366 preferably extend along the longitudinal extent of inner side wall 334, that is, the corrugated shape is continuous along at least a portion of the height of inner side wall 334, such as from adjacent end wall 312 to adjacent end wall 336, for example. Ribs 362 and/or grooves 366 can, in some cases, have a generally rectangular conformation, although other conformations may be used without departing from the scope and intent of the present disclosure. Additionally, it will be appreciated that the cross-sectional profile (e.g., shape, radius or curvature) of wall portions 360 including any features or elements thereof can vary in the longitudinal direction, such as along at least a portion of inner side wall 334, for example.

One example of a suitable configuration is shown in FIG. 10 in which inner side wall 334 includes a plurality of ribs 362 and a plurality of grooves 366 that correspond to the plurality of ribs. Ribs 362 are shown as including side surface portions 370 that are spaced apart from one another and interconnected by outer surface portions 372. Grooves 366 are shown as including side surface portions 374 that are spaced apart from one another and interconnected by inner surface portions 376.

It will be appreciated that the use of the corrugated conformation can increase the rigidity and/or strength of the piston inner wall, which may allow for a configuration having reduced wall thicknesses and a corresponding reduction in weight. For example, it may be possible to use support walls 344 that have a reduced thickness dimension and/or extend at a reduced number of perimeter/circumferentially spaced locations between inner side wall 334 and outer side wall 238. Additionally, ribs 362, when used with or without grooves 366, may, in some cases, allow for the manufacture and use of an inner side wall 334 having a reduced thickness dimension as a result of changing the section modulus of the inner side wall. In addition to compressive forces, inner side wall 334 may also be more resistant to moments and torsional forces exerted on the piston due to the inclusion of ribs 362.

Furthermore, it will be appreciated, that a piston, such as piston 204, for example, may be manufactured by way of an injection molding or other, similar process, and thus is able to adopt a variety of conformations. For example, the cross-section of inner side wall 334 may have a generally sinusoidal pattern that eliminates the sharper corners of the illustrated rectangular/squared rib corners and would also eliminate stress risers. It is also contemplated that the sinusoidal pattern may employ slightly less material without any decrease in performance characteristics. Ribs 362 preferably extend continuously and longitudinally from adjacent end wall 312 toward end wall 336, although manufacture through an injection molding (or other similar) process would also allow non-linear, discontinuous conformations, and/or irregular perimeter/circumferential spacing of the ribs. However, a regular pattern of continuous, longitudinally extending ribs 362 and/or grooves 366 may provide for ease of manufacture (i.e. even flow of the injected fluid material during injection molding) and even distribution of forces in the resultant piston.

Piston body 310 can also include one or more cover-engagement features disposed on or along outer side wall 238 adjacent end 308. As one example, a groove (not shown) could extend into the outer side wall from along one of the inner and outer surfaces thereof. In the exemplary arrangement shown in FIGS. 4-11, piston body 310 includes a plurality of recesses 378 that are disposed in spaced-apart relation to one another around the outer surface of outer side wall 238. It will be appreciated that recesses 378 can be positioned in any suitable pattern or arrangement. For example, recesses 378 are shown in FIGS. 4-11 as being positioned in approximate alignment with the transition between adjacent wall portions 354. Additionally, piston body 310 can, optionally, include a plurality of slots 380 formed by opposing side walls 380A (FIG. 11) that extend longitudinally along the piston body and extend into the outer side wall from along one of the inner and outer surfaces thereof. In the arrangement shown, slots 380 extend radially-inwardly into the outer side wall from along an outer surface thereof. It will be appreciated that slots 380 can be positioned in any suitable pattern or arrangement, and preferably are at least approximately aligned with recesses 378. It will be appreciated, however, that other arrangements could alternately be used.

With reference, now, to FIGS. 5-8 and 12-14, cover 246 is shown as including a cover wall 382 extending radially between an outer peripheral edge 384 and an inner peripheral edge 386 that at least partially defines an opening 388 extending therethrough. As discussed above, cover 246 can be used as a protective shield to withstand and/or deflect road debris and other objects from impacting piston 204. As such, it will be appreciated that cover 246 can take any suitable form or shape, and can be configured in any manner suitable for withstanding impacts from such road debris and/or other objects. As one example, cover 246 can include a plurality of ribs 390 that extend radially along cover wall 382 and project axially outwardly therefrom from along a first surface 392 of the cover wall. In a preferred arrangement, ribs 390 are disposed toward piston 204 in an assembled condition, and cover wall 382 includes a second or outer surface 394 that can be relatively smooth and featureless, such as may be useful for avoiding the collection of dirt and debris. One or more drainage holes 396 can, optionally, be provided and extends through cover wall 382, such as to provide egress for condensation, for example.

Cover wall 382 can include a radially-inward wall portion 398 disposed inwardly of ribs 390 and a securement wall portion 400 disposed generally transverse to ribs 390 and extending in a generally axial direction. Securement wall portion 400 at least partially defines inner peripheral edge 386 and opening 388 formed thereby. In a preferred arrangement, opening 388 is dimensioned to abuttingly engage radially-outer surfaces 350 of projections 348 on piston body 310. In this manner, cover 246 can be at least partially supported on piston 204 in the assembled condition.

Cover wall 382 can also include one or more piston-engaging elements or features, such as can be used to abuttingly engage and thereby at least partially retain cover 246 on or along piston 204. In the exemplary arrangement shown in FIGS. 4-7 and 12-14, a plurality of axially-extending engagement walls 402 are disposed in spaced-apart relation to one another around the periphery of cover wall 382. A projection 404 extends from the engagement walls in a radially-inwardly direction. In a preferred arrangement, engagement walls 402 and projections 404 thereon are at least approximately aligned with recesses 378 and slots 380, if included, of piston body 310. It will be appreciated that engagement walls 402 and projections 404 at least partially define an outermost inside dimension of cover 246, and that this outermost inside dimension is less than a corresponding outside dimension of piston body 310. In such case, engagement walls 402 and projections 404 can be radially-outwardly displaced for receipt within slots 380, if provided, such that cover wall 382 will urge projections 404 radially-inwardly into engagement with recesses 378 of the piston body. In this manner, cover 246 can be at least partially retained on piston 204.

As used herein with reference to certain features, elements, components, and/or structures, numerical ordinals (e.g., first, second, etc.) may be used to denote different singles of a plurality or otherwise identify certain features, elements, components, and/or structures, and do not imply any order or sequence unless specifically defined. Additionally, terms such as "transverse," "radial," "circumferential," "longitudinal," and the like, are to be broadly interpreted and can include a wide range of relative angular orientations. For example, the term "transverse" should be interpreted as including a wide range of relative angular orientations, such as a range of plus (+) or minus (−) 45 degrees from horizontal or the referenced feature or component.

Furthermore, the term gas is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be further recognized that numerous different features and/or components are presented in the embodiments shown and described herein, and that no one embodiment may be specifically shown and described as including all such features and components. As such, it is understood that the subject matter of the present disclosure is intended to encompass any and all combinations of the different features and components that are shown and described herein, and, without limitation, that any suitable arrangement of features and components in any combination can be used. Thus it is be distinctly understood that any such combination of features and/or components, whether or not specifically embodied herein, are intended to find support in the present disclosure.

The subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles thereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly comprising:
a flexible wall having a longitudinal axis, said flexible wall extending peripherally about said longitudinal axis between opposing first and second ends and at least partially defining a spring chamber;
a first end member operatively connected in a substantially fluid-tight manner across said first end of said flexible wall; and,
a second end member spaced longitudinally from said first end member and operatively connected in a substantially fluid-tight manner across said second end of said flexible wall, said second end member including an outer side wall having an outer surface with a first plurality of corrugations, an inner side wall having an inner surface and an opposing outer surface with a second plurality of corrugations, said first plurality of corrugations disposed peripherally about said longitudinal axis and extending longitudinally along said outer side wall such that said first plurality of corrugations are exposed along said outer surface of said outer side wall, and said second plurality of corrugations disposed peripherally about said longitudinal axis and extending longitudinally along said inner side wall such that said second plurality of corrugations are exposed along at least one of said inner and outer surfaces of said inner side wall;
said second end member having a cross-sectional profile in a reference plane oriented transverse to said longitudinal axis in which at least said first plurality of corrugations include a curved wall portion having wall portion curvature and an outermost tangential extent, said second end member having an end member curvature defined by a plurality of said outermost tangential extents and approximating an outermost periphery of said second end member in said reference plane, said end member curvature being different than said wall portion curvature of said curved wall portions.

2. A gas spring assembly according to claim 1, wherein said second plurality of corrugations includes a plurality of ribs projecting outwardly from one of said inner and outer surfaces of said inner side wall.

3. A gas spring assembly according to claim 1, wherein said second plurality of corrugations includes a plurality of grooves extending into said inner side wall from along one of said inner and outer surfaces.

4. A gas spring assembly according to claim 1, wherein said second end member includes a plurality of connecting wall portions disposed in spaced relation to one another about said outer side wall with one of said connecting wall portions disposed between adjacent ones of said plurality of curved wall portions.

5. A gas spring assembly according to claim 4, wherein said second end member includes a plurality of transition wall portions disposed in spaced relation to one another about said outer side wall with one of said transition wall portions disposed in spaced relation between one of said curved wall portions and a corresponding one of said connecting wall portions.

6. A gas spring assembly according to claim 1, wherein said at least one side wall includes a cross-sectional profile taken transverse to said axis that varies in a longitudinal direction along said outer side wall.

7. A gas spring assembly according to claim 1, wherein said second end member includes at least one cavity that is fluidically isolated from said spring chamber and includes an opening in fluid communication with an external atmosphere, said gas spring assembly further comprising a cover secured along said second end member and at least partially across said opening to said at least one cavity.

8. A gas spring assembly according to claim 7, wherein said inner side wall is disposed in radially spaced relation to said outer side wall such that said second end member includes an open end with said cavity at least partially formed between said inner side wall and said outer side wall, and said cover is operatively connected to at least one of said inner side wall and said outer side wall across said open end of said second end member.

9. A gas spring assembly according to claim 8, wherein said second end member includes a plurality of recesses disposed in peripherally-spaced relation to one another about said outer side wall, and said cover includes a plurality of projections disposed in peripherally-spaced relation to one another and dimensioned to cooperatively engage said plurality of recesses to at least partially secured said cover on said second end member.

10. A gas spring assembly according to claim 8, wherein said second end member includes a plurality of slots disposed in peripherally-spaced relation to one another about said outer side wall, and said cover includes a plurality of engagement walls disposed in peripherally-spaced relation to one another and dimensioned to cooperatively engage said plurality of slots to at least partially secure said cover on said second end member.

11. A gas spring assembly comprising:
a flexible wall having a longitudinal axis and extending peripherally about said longitudinal axis between opposing first and second ends and at least partially defining a spring chamber;
a first end member operatively connected in a substantially fluid-tight manner across said first end of said flexible wall;
a second end member spaced longitudinally from said first end member and operatively connected in a substantially fluid-tight manner across said second end of said flexible wall, said second end member including:
an inner side wall;
an outer side wall disposed in radially spaced relation to said inner side wall such that at least one cavity that is fluidically isolated from said spring chamber is formed therebetween, said inner side wall and said outer side wall at least partially defining an open end of said second end member such that said at least one cavity is in fluid communication with an external atmosphere;
a plurality of corrugations disposed peripherally about said outer side wall; and,
a plurality of projections disposed in peripherally-spaced relation to one another about said inner side wall; and,
a cover secured along said second end member, said cover disposed at least partially across said at least one cavity and said open end of said second end member, said cover operatively connected to at least one of said inner side wall and said outer side wall, and said cover including a securement wall portion dimensioned to cooperatively engage said plurality of projections to at least partially secure said cover on said second end member.

12. A suspension system comprising:
a pressurized gas system; and,
a gas spring assembly according to claim 11 in fluid communication with said pressurized gas system.

13. An end member and cover assembly comprising:
an end member for use in forming a gas spring assembly, said end member including an end member body having a longitudinally-extending axis and extending longitudinally between first and second body ends, said end member body including:
an outer side wall extending peripherally about said axis, said outer side wall including an outer surface and at least partially defining at least one cavity having an opening;
a plurality of corrugations disposed peripherally about said axis in spaced-relation to one another along said outer side wall, said plurality of corrugations including a plurality of curved wall portions, a plurality of connecting wall portions and a plurality of transition wall portions with one of said connecting wall portions interposed between adjacent ones of said curved wall portions and one of said transition wall portions interposed between one of said curved wall portions and an adjacent one of said connecting wall portions, said curved wall portions including a wall portion curvature and an outermost tangential extent with said outermost tangential extent of a plurality of said curved wall portions defining an end member reference circle having an end member curvature that is greater than said wall portion curvature; and
a plurality of recesses disposed in peripherally-spaced relation to one another about said outer side wall; and,
a cover secured along said end member and at least partially across said opening to said at least one cavity, said cover including a plurality of projections disposed in peripherally-spaced relation to one another and dimensioned to cooperatively engage said plurality of recesses to at least partially secured said cover on said second end member.

14. An end member and cover assembly according to claim 13, wherein said end member curvature has a center disposed along said longitudinal axis, and said plurality of curved wall portions have wall portion centers disposed radially outward of said center of said end member curvature.

15. An end member and cover assembly according to claim 13, wherein said plurality of connecting wall portions have a curvature and a center of curvature with said curvature of said connecting wall portions being smaller than said wall portion curvature of said curved wall portions such that said centers of curvature of said connecting wall portions are disposed radially inward of said end member reference circle.

16. An end member and cover assembly according to claim 13, wherein said at least one side wall includes a cross-sectional profile taken transverse to said axis that varies in a longitudinal direction along said outer side wall.

17. An end member and cover assembly according to claim 13, wherein said plurality of corrugations extend helically about said longitudinal axis.

* * * * *